(12) United States Patent
Chikagawa

(10) Patent No.: US 10,525,795 B2
(45) Date of Patent: *Jan. 7, 2020

(54) VEHICLE AIR-CONDITIONING DEVICE

(71) Applicant: MITSUBISHI HEAVY INDUSTRIES AUTOMOTIVE THERMAL SYSTEMS CO., LTD., Kiyosu-shi, Aichi (JP)

(72) Inventor: Noriyuki Chikagawa, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 949 days.

This patent is subject to a terminal disclaimer.

(21) Appl. No.: 14/378,845

(22) PCT Filed: Feb. 25, 2013

(86) PCT No.: PCT/JP2013/054745
§ 371 (c)(1),
(2) Date: Aug. 14, 2014

(87) PCT Pub. No.: WO2013/133068
PCT Pub. Date: Sep. 12, 2013

(65) Prior Publication Data
US 2015/0031279 A1    Jan. 29, 2015

(30) Foreign Application Priority Data

Mar. 9, 2012    (JP) .................................. 2012-053026

(51) Int. Cl.
*B60D 1/34* (2006.01)
*B60H 1/34* (2006.01)
*B60H 1/00* (2006.01)

(52) U.S. Cl.
CPC ....... *B60H 1/3414* (2013.01); *B60H 1/00678* (2013.01); *B60H 1/00857* (2013.01);
(Continued)

(58) Field of Classification Search
CPC ............................... B60H 1/34; B60H 1/3413
(Continued)

(56) References Cited

U.S. PATENT DOCUMENTS 5,482,506 A * 1/1996 Tsuda .................. B29C 45/0017
454/155
5,881,558 A    3/1999 Kawahara et al.
(Continued)

FOREIGN PATENT DOCUMENTS

CN          1891516 A       1/2007
DE          3821541 A1      12/1989
(Continued)

OTHER PUBLICATIONS

Office Action dated Oct. 4, 2016, issued in counterpart Japanese Patent Application No. 2012-053026, with English translation. (10 pages).
(Continued)

*Primary Examiner* — Steven B McAllister
*Assistant Examiner* — Samantha A Miller
(74) *Attorney, Agent, or Firm* — Westerman, Hattori, Daniels & Adrian, LLP

(57) ABSTRACT

Provided is a vehicle air-conditioning device in which a lever (7) for turning a damper is rotatably fitted and supported on a unit casing (2), wherein one of a support part (13) on the unit casing (2) side and a fitting part (8) on the lever side is provided with an elastically deformable fitting claw (27), while the other of the support part (13) and the fitting part (8) is provided with a fitting hole (24), into which the fitting claw (27) is fitted and engaged, and a bearing boss
(Continued)

part (23) and a fitting shaft part (25), which are rotatably fitted together with a bearing clearance between them, are provided on the outer periphery of the fitting claw (27) and the fitting hole (24).

5 Claims, 6 Drawing Sheets

(52) U.S. Cl.
CPC .............. *B60H 2001/00707* (2013.01); *B60H 2001/3485* (2013.01)

(58) Field of Classification Search
USPC ........................................................ 454/152
See application file for complete search history.

(56) References Cited

U.S. PATENT DOCUMENTS

| | | | |
|---|---|---|---|
| 6,047,951 | A | 4/2000 | Ito et al. |
| 6,383,071 | B1 | 5/2002 | Takeuchi et al. |
| 6,520,850 | B1 | 2/2003 | Buckman et al. |
| 7,404,760 | B2 | 7/2008 | Bowler et al. |
| 7,871,316 | B2 | 1/2011 | Hori et al. |
| 7,985,124 | B2 | 7/2011 | Komowski |
| 2003/0157880 | A1* | 8/2003 | Nishida ................ B60H 1/3414 454/155 |
| 2006/0030255 | A1 | 2/2006 | Seki |
| 2006/0073781 | A1* | 4/2006 | Mochizuki ........... B60H 1/3421 454/152 |
| 2007/0111653 | A1* | 5/2007 | Endou ................ B60H 1/3421 454/155 |
| 2007/0175518 | A1 | 8/2007 | Vincent et al. |

FOREIGN PATENT DOCUMENTS

| | | |
|---|---|---|
| DE | 4420160 A1 | 1/1995 |
| JP | 05-025291 Y2 | 6/1993 |
| JP | 06-018010 U | 3/1994 |
| JP | 8-230445 A | 9/1996 |
| JP | 11-180129 A | 7/1999 |
| JP | H11-351260 A | 12/1999 |
| JP | 2001-199226 A | 7/2001 |
| JP | 2002-274158 A | 9/2002 |
| JP | 2003-276423 A | 9/2003 |
| JP | 2004-058941 A | 2/2004 |
| JP | 2004-299540 A | 10/2004 |
| JP | 2004299540 A * | 10/2004 |
| JP | 2006-341724 A | 12/2006 |
| JP | 2007-209178 A | 8/2007 |
| JP | 2008-030520 A | 2/2008 |
| JP | 4487436 B2 | 6/2010 |
| JP | 4513656 B2 | 7/2010 |
| JP | 4552162 B2 | 9/2010 |

OTHER PUBLICATIONS

Office Action dated Nov. 27, 2015, issued in counterpart German Application No. 112013006580.0, w/Engligh translation (9 pages).
Office Action dated Dec. 20, 2018, issued in counterpart DE application No. 11 2013 006 580.0, with English translation. (12 pages).
International Search Report dated May 28, 2013, issued in corresponding application No. PCT/JP2013/054745.
Written Opinion dated May 28, 2013, issued in corresponding application No. PCT/JP2013/054745.
Office Action dated Oct. 26, 2015, issued in counterpart CN Application No. 201380012886.5, with English translation (15 pages).
Final Office Action dated May 18, 2018, issued in U.S. Appl. No. 14/379,910 (16 pages).
Non-Final dated Dec. 2, 2016, issued in U.S. Appl. No. 14/379,910 (7 pages).

* cited by examiner

VEHICLE AIR-CONDITIONING DEVICE

TECHNICAL FIELD

The present invention relates to a vehicle air-conditioning device in which a lever for turning a damper is rotatably fitted and supported on a unit casing.

BACKGROUND ART

In a vehicle air-conditioning device, air-conditioned air at a temperature regulated in an HVAC unit (Heating Ventilation and Air Conditioning Unit) is blown out selectively from one of multiple air outlets opened to the inside of the vehicle to thereby condition the air inside the vehicle. The configuration of these multiple air outlet mode dampers is such that, when a lever rotatably fitted and supported on a side surface of the unit casing is rotated either by manual operation or by automatic control, the air outlet mode dampers are opened or closed in conjunction with one another, through a link coupled with the lever, so as to blow out the air-conditioned air to the inside of the vehicle from the air outlet selected according to the air outlet mode.

The lever for turning the air outlet mode dampers is, for example, (1) rotatably fitted and supported through a resin washer and a screw or (2) rotatably fitted, engaged, and supported through a fitting claw, on the side surface of the unit casing. PTL 1 discloses a supporting structure in which a fitting part of a link plate is rotatably fitted in a tapping boss part and an outer ring part provided on a casing side, and the link plate is fastened and supported with a link washer and a tapping screw. On the other hand, PTL 2 discloses a device in which a link driving member is rotatably fitted on the outer periphery of a hollow protrusion provided on the casing side, and a drive shaft of an actuator, which drives the link driving member to rotate, is fitted and supported on the hollow inner periphery of the protrusion.

CITATION LIST

Patent Literature

{PTL 1}
The Publication of Japanese Patent No. 4513656
{PTL 2}
Japanese Examined Utility Model Application, Publication No. Hei 5-25291

SUMMARY OF INVENTION

Technical Problem

However, the configuration in which the lever is rotatably fitted and supported using a washer and a screw as in the configuration (1) above and PTL 1, requires screw fastening work during assembly, which adds to the assembly man-hours. In addition, when the lever is used commonly for an air conditioner (air-conditioning device) designed for manual operation and an air conditioner (air-conditioning device) designed for automatic control, the configuration in which the lever is fastened and supported with a screw at the center of the rotational shaft does not allow an actuator for automatic control to be directly coupled with and disposed at a rotational shaft portion of the lever. This makes it necessary to secure a separate installation space for the actuator and couple it with the lever through a link, etc., so that the number of the parts increases and the merits of using common parts are diminished.

On the other hand, the configuration in which the lever is fitted, engaged, and supported with a claw as in the configuration (2) above requires simply engaging the claw, so that the assembly work can be facilitated. However, since the claw is deformable, the entire fitting part can be elastically deformed. This causes the lever to move accordingly in the out-of-plane direction, affecting the accuracy of the damper stop position and deteriorating the accuracy of the damper.

Moreover, in the configuration shown in PTL 2, as the link driving member is not engaged using a screw or a claw, the link driving member comes off in the axial direction along with the actuator when it is removed. That is, this configuration is not intended for common use of the link driving member between the manually-operated air conditioner and the automatically-controlled air conditioner, nor does it suggest a configuration for that purpose.

Having been made in view of this situation, the present invention aims to provide a vehicle air-conditioning device in which the lever is fitted, engaged, and supported with claws, and yet which can reliably limit positional shift, etc. of the lever in the out-of-plane direction, and moreover allows the lever to be used commonly for the air conditioner designed for manual operation and the air conditioner designed for automatic control.

Solution to Problem

In order to solve the above problems, the vehicle air-conditioning device of the present invention has adopted the following solutions:

According to the present invention, there is provided a vehicle air-conditioning device, in which a lever for turning a damper is rotatably fitted and supported on a unit casing and in which the lever can be rotated either by manual operation or by automatic control, wherein one of a support part on the unit casing side and a fitting part on the lever side is provided with an elastically deformable fitting claw, while the other of the support part and the fitting part is provided with a fitting hole, into which the fitting claw is fitted and engaged, and a bearing boss part and a fitting shaft part, which are rotatably fitted together with a bearing clearance between them, are provided on the outer periphery of the fitting claw and the fitting hole.

According to the present invention, in the vehicle air-conditioning device in which the lever for turning the damper is rotatably fitted and supported on the unit casing and in which the lever can be rotated either by manual operation or by automatic control, one of the support part on the unit casing side and the fitting part on the lever side is provided with the elastically deformable fitting claw, while the other of the support part and the fitting part is provided with the fitting hole, into which the fitting claw is fitted and engaged, and the bearing boss part and the fitting shaft part, which are rotatably fitted together with a bearing clearance between them, are provided on the outer periphery of the fitting claw and the fitting hole. In this way, fitting and engaging the fitting claw and the fitting hole allows the lever to be engaged on the unit casing in the axial direction without using a screw, and rotatably fitting the bearing boss part and the fitting shaft part with a bearing clearance between them on the outer periphery of these fitting claw and fitting hole can prevent deformation and positional shift in the out-of-plane direction of the lever, which is supported by the elastically deformable fitting claw, and allows the lever to be rotatably fitted and supported on the unit casing. Thus, according to the present invention, it is possible to reduce the assembly manhours of the lever by omitting the screw, and to increase the accuracy of the damper stop position and improve the air conditioning performance by eliminating the positional shift of the lever.

In a vehicle air-conditioning device of a first aspect of the present invention, the fitting claw is provided at regular intervals at three or more positions in the circumferential direction.

According to the first aspect of the present invention, in which the fitting claw is provided at regular intervals at three or more positions in the circumferential direction, fitting and engaging the elastically deformable fitting claws, which are provided at regular intervals at three or more positions in the circumferential direction, into the fitting hole allows the lever to be stably and reliably engaged on the unit casing in the axial direction. In addition, fitting the bearing boss part and the fitting shaft part on the outer periphery of the fitting claws and the fitting hole can reliably prevent the positional shift of the lever due to deformation of the fitting claws. Thus, according to the first aspect of the present invention, it is possible to reduce the assembly manhours of the lever by omitting the screw, and at the same time to prevent deformation and positional shift in the out-of-plane direction of the lever due to deformation of the fitting claws.

In a vehicle air-conditioning device of a second aspect of the present invention, the bearing clearance between the bearing boss part and the fitting shaft part is set to 0.1 to 0.2 mm, and their molding draft angle is approximately 0°.

According to the second aspect of the present invention, since the bearing clearance between the bearing boss part and the fitting shaft part is set to 0.1 to 0.2 mm and their molding draft angle is approximately 0°, the amount of the positional shift of the lever can be limited at the most to the bearing clearance defined between the bearing boss part and the fitting shaft part, namely, to about 0.1 to 0.2 mm. Thus, according to the second aspect of the present invention, it is possible to increase the accuracy of the damper stop position and improve the air conditioning performance.

In a vehicle air-conditioning device of a third aspect of the present invention, the relation of the axial length L of the fitting part between the bearing boss part and the fitting shaft part to the diameter D of the bearing boss part and the fitting shaft part is L≥0.5D.

According to the third aspect of the present invention, the relation of the axial length L of the fitting part between the bearing boss part and the fitting shaft part to the diameter D of the bearing boss part and the fitting shaft part is L≥0.5D. In this way, a sufficient axial length L of the fitting part between the bearing boss part and the fitting shaft part can be secured, and the wobbling of the lever in the radial direction can be almost eliminated. Thus, according to the third aspect of the present invention, it is possible to limit the positional shift of the lever and increase the accuracy of the damper stop position.

In a vehicle air-conditioning device of a fourth aspect of the present invention, a shaft coupling hole, into which an output shaft of an actuator for automatic control is inserted, is provided at the center position of the fitting part on the lever side.

According to the fourth aspect of the present invention, the shaft coupling hole, into which the output shaft of the actuator for automatic control is inserted, is provided at the center position of the fitting part on the lever side. In this way, engaging the lever by means of the fitting claws and the fitting hole and omitting the screw allows the provision of the shaft coupling hole for inserting the output shaft of the actuator for automatic control at the center position of the fitting part of the lever. Thus, according to the fourth aspect of the present invention, when the air conditioner is designed for automatic control, the actuator can be installed with its output shaft directly inserted into the shaft coupling hole, so that the installation space of the actuator can be secured and the installation can be facilitated.

In the vehicle air-conditioning device of the fourth aspect of the present invention, the vehicle air-conditioning device may be configured such that installing the actuator for automatic control with its output shaft coupled with the shaft coupling hole of the lever can configure an automatically-controlled air conditioner, while connecting a wire at a predetermined position of the lever can configure a manually-operated air conditioner.

According to such a configuration, installing the actuator for automatic control with its output shaft coupled with the shaft coupling hole of the lever can configure the automatically-controlled air conditioner, while connecting a wire at a predetermined position of the lever can configure the manually-operated air conditioner. In this way, the lever can be used commonly for the air conditioner designed for automatic control and the air conditioner designed for manual operation without the need for changing the lever. In addition, as the actuator for automatic control can be installed with its output shaft directly coupled with the shaft coupling hole of the lever, the installation space of the actuator can be secured. Thus, it is possible to achieve a cost reduction by reducing the variety of the parts, as well as to secure the installation space of the functional parts and increase the flexibility in the layout of these parts when the air conditioner is designed for automatic control.

Advantageous Effects of Invention

According to the present invention, fitting and engaging the fitting claws and the fitting hole allows the lever to be engaged on the unit casing in the axial direction without using a screw, and rotatably fitting the bearing boss part and the fitting shaft part with a bearing clearance between them on the outer periphery of these fitting claws and fitting hole can prevent deformation and positional shift in the out-of-plane direction of the lever, which is supported by the elastically deformable fitting claws, and allows the lever to be rotatably fitted and supported on the unit casing. Thus, it is possible to reduce the assembly manhours of the lever by omitting the screw and to increase the accuracy of the damper stop position and improve the air conditioning performance by eliminating the positional shift of the lever.

DESCRIPTION OF EMBODIMENTS

In the following, embodiments of the present invention will be described with reference to the drawings.
(First Embodiment)

A first embodiment of the present invention will now be described using FIG. 1 through FIG. 4.

Figure 1A:
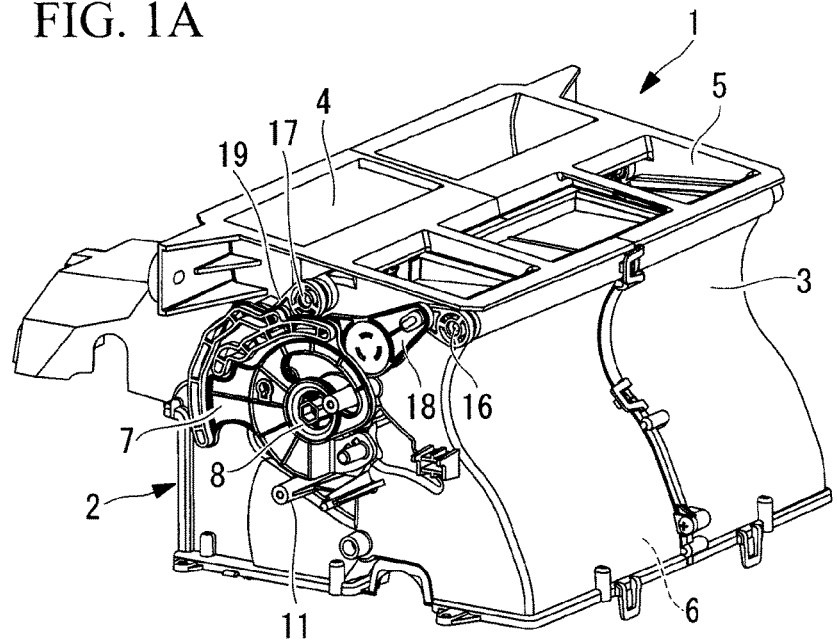
FIG. 1A is a perspective outside view of a major part of a vehicle air-conditioning device, when designed for manual operation, according to a first embodiment of the present invention.
Figure 1B:
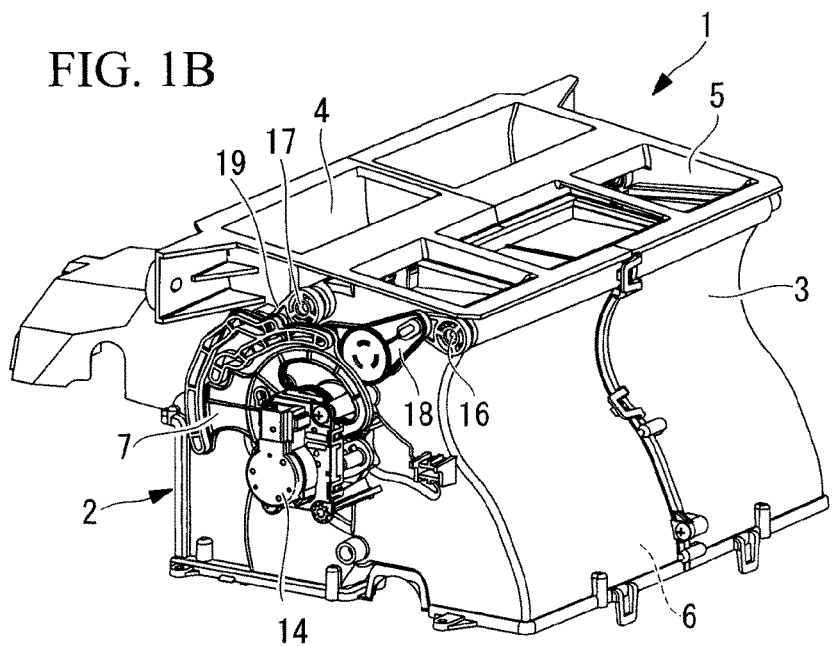
FIG. 1B is a perspective outside view of a major part of a vehicle air-conditioning device, when designed for automatic control, according to the first embodiment of the present invention.
Figure 2:
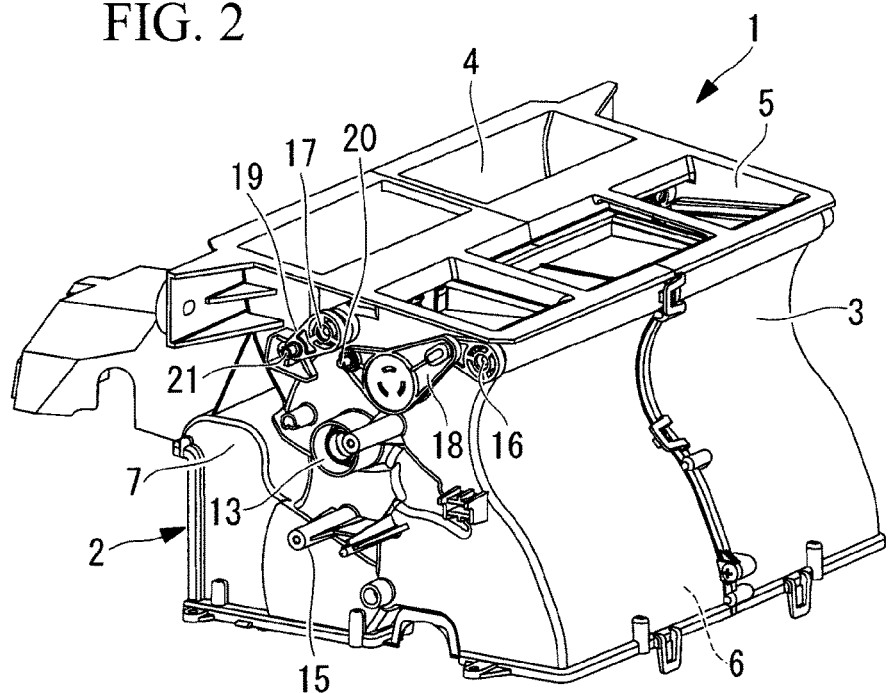
FIG. 2 is a perspective outside view of the vehicle air-conditioning device shown in FIG. 1 with its lever removed.

FIG. 1A shows a perspective outside view of a major part of a vehicle air-conditioning device, when designed for manual operation, according to the first embodiment of the present invention. FIG. 1B shows a perspective outside view of a major part of a vehicle air-conditioning device, when designed for automatic control, according to the first embodiment of the present invention. FIG. 2 shows a perspective outside view of the vehicle air-conditioning device with its lever removed.

An HVAC unit (Heating Ventilation and Air Conditioning Unit) 1, which constitutes the vehicle air-conditioning device (air conditioner), has a unit casing 2. An air outlet part 3 for blowing out temperature-regulated, air-conditioned air is typically provided with three air outlets: a defroster air outlet 4, a face air outlet 5, and a foot air outlet 6 (not shown). The air-conditioned air is blown out to the inside of the vehicle from each of the air outlets 4 to 6 through a duct.

In the inside of the unit casing 2 of the HVAC unit 2, an evaporator, a heater, an air mixing damper, etc. are disposed sequentially along the air passage. The outside air or the air inside the vehicle (also called the inside air) taken in through a blower unit is cooled or heated and regulated to a set temperature before being blown out to the inside of the vehicle selectively from one of the above-mentioned three air outlets 4 to 6. Multiple (two or three) air outlet mode dampers (not shown) are provided inside the HVAC unit 2, and these air outlet mode dampers allow selective opening and closing of the three air outlets 4 to 6.

That is, taking as an example the case where two air outlet mode dampers, a foot damper and a defroster/face damper, are provided, this function is explained as follows:

(1) In a defroster mode, the air-conditioned air is blown out from the defroster air outlet 4, with the foot air outlet 6 closed by the foot damper and the face air outlet 5 closed by the defroster/face damper;

(2) In a face mode, the air-conditioned air is blown out from the face air outlet 5, with the foot air outlet 6 closed by the foot damper and the defroster air outlet 4 closed by the defroster/face damper;

(3) In a foot mode, the air-conditioned air is blown out from the foot air outlet 6, with the foot air outlet 6 opened by the foot damper and the air-conditioned air toward the face air outlet 5 and the defroster air outlet 4 shut off;

(4) In a defroster/foot mode, the air-conditioned air is blown out from both the defroster air outlet 4 and the foot air outlet 6, with the face air outlet 5 closed by the defroster/face damper and the foot damper set to an intermediate opening degree;

(5) In a bi-level mode, the air-conditioned air is blown out from both the face air outlet 5 and the foot air outlet 6, with the defroster air outlet 4 closed by the defroster/face damper and the foot damper set to an intermediate opening degree.

These five air outlet modes can be selected by switching the two dampers. The HVAC unit 1 having such a configuration is publicly known. Alternatively, three dampers may be individually provided for each of the air outlets 4 to 6.

Figure 3A:
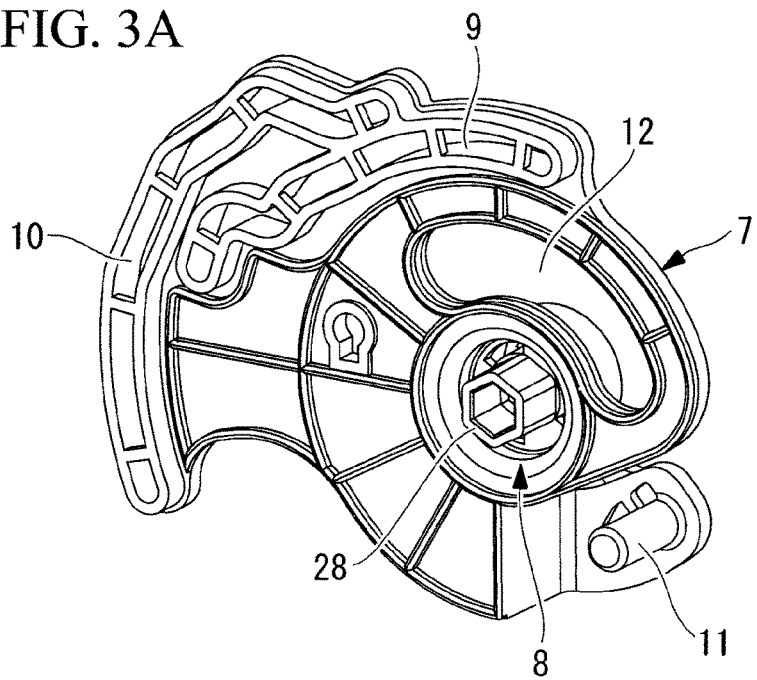
FIG. 3A is a perspective view from the left side of the lever of the vehicle air-conditioning device shown in FIG. 1A and FIG. 1B.
Figure 3B:
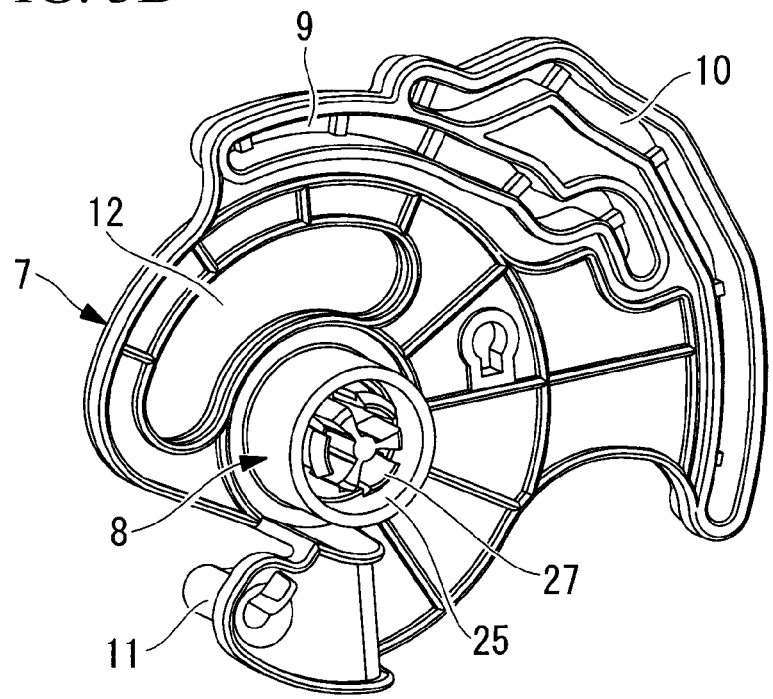
FIG. 3B is a perspective view from the right side of the lever of the vehicle air-conditioning device shown in FIG. 1A and FIG. 1B.

The above-described two dampers, the foot damper and the defroster/face damper, are opened or closed in conjunction with each other through a lever 7 which is rotatably fitted and supported on a side surface of the unit casing 2. FIG. 2 shows a perspective outside view of the vehicle air-conditioning device with the lever 7 removed. FIG. 3A shows a perspective view from the left side of the lever 7. FIG. 3B shows a perspective view from the right side of the lever 7.

The lever 7 is provided with a fitting boss part (fitting part) 8 at the center part, and is a plate-like integral molded part of a resin material (e.g., PBT, POM, etc.) with multiple reinforcing ribs provided in the radiation direction and the circumferential direction. Cam grooves 9 and 10 for turning the two foot and defroster/face dampers are provided on the outer periphery of the lever 7.

The lever 7 is also provided with a wire connection part 11 for connecting a wire for manual operation at a portion on the side opposite to the portion where the cam grooves 9 and 10 are provided across the fitting boss part 8, and the lever 7 is provided with an arc-shaped cutout 12 along an outer peripheral portion of the fitting boss part 8. Mounting bosses 15 are passed through the cutout 12 when an actuator 14 for automatic control to be described later is installed. This lever 7 is rotatably fitted, engaged, and supported through the fitting boss part 8 on a fitting support part (support part) 13, which is provided on the side surface of the unit casing 2, by means of a bearing boss part 23, a fitting hole 24, and a fitting shaft part 25, fitting claws 27, etc., to be described later.

Other than the fitting support part 13, the mounting bosses 15 for installing the actuator 14 (see FIG. 1B) for automatic control are integrally molded at three positions on the side surface of the unit casing 2, and two of these mounting bosses protrude laterally through the cutout 12 of the lever 7. The unit casing 2 is molded of a resin material such as PP. In addition, link mechanisms 18 and 19 for respective systems coupled with the shaft ends of rotational axes 16 and 17 of the foot damper and the defroster/face damper are disposed on the side surface of the unit casing 2.

Pins 20 and 21, which are respectively provided for the link mechanisms 18 and 19, are slidably engaged in the cam grooves 9 and 10 of the lever 7. When the lever 7 is rotated through manual operation or the actuator 14 and the link mechanisms 18 and 19 are turned through the pins 20 and 21 along the shapes of the cam grooves 9 and 10 at a predetermined position, the two dampers, the foot damper and the defroster/face dampers, are caused to turn through the rotational axes 16 and 17 at a predetermined timing. Such opening and closing mechanisms of the damper realized by the lever 7 are publicly known.

Figure 4A:
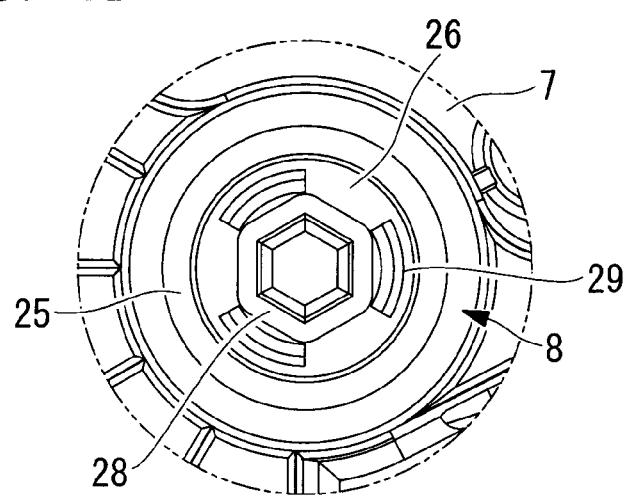
FIG. 4A is a cross-sectional view of a fitting support part for fitting and supporting the lever shown in FIG. 3 on a unit casing.
Figure 4B:
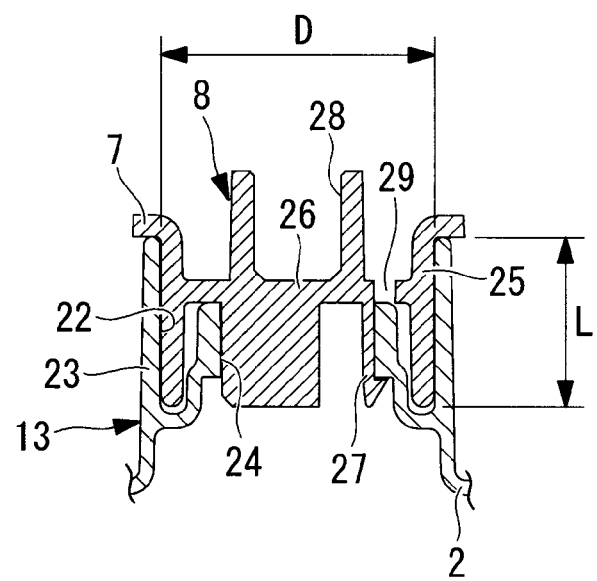
FIG. 4B is a top view of the fitting support part for fitting and supporting the lever shown in FIG. 3 on the unit casing.
Figure 4C:
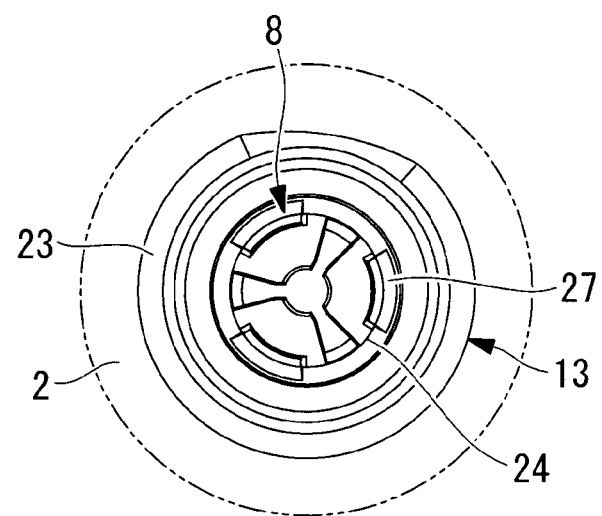
FIG. 4C is a bottom view of the fitting support part for fitting and supporting the lever shown in FIG. 3 on the unit casing.

Next, referring to FIG. 4A, FIG. 4B, and FIG. 4C, description will be given of the details of the supporting structure for fitting and supporting the lever 7, through its fitting boss part (fitting part) 8, on the fitting support part (support part) 13 provided on the side surface of the unit casing 2.

The fitting support part 13 on the unit casing 2 side is integrally molded on the side surface of the unit casing 2 so as to protrude outward from the side surface. The fitting support part 13 is provided with: the bearing boss part 23 which is relatively large in outer diameter and in which the inner peripheral surface serves as the bearing surface 22; and the fitting hole 24 which is provided integrally with the bearing boss part 23 on its inner periphery with a predetermined clearance to the bearing surface 22 and which has a smaller inner diameter than the diameter of the bearing surface 22.

The relation of the axial length L to the diameter D of the bearing surface 22 of the bearing boss part 23 is L≥0.5D, and more preferably L≥0.6D. In addition, the molding draft angle of the bearing surface 22 of the bearing boss part 23 is approximately 0°. Moreover, the height of the outward protrusion of the bearing boss part 23 during molding is larger than the outer end of the fitting hole 24, so that the fitting hole 24 is housed in the bearing boss part 23.

On the other hand, the fitting boss part 8 on the lever 7 side is provided with: the fitting shaft part 25 which is integrally molded so as to protrude inward from the side surface of the lever 7; multiple elastically deformable fitting claws 27 which are provided on the inner periphery of the fitting shaft part 25 so as to protrude inward from a partitioning wall 26 and which are arranged at regular intervals at three or more positions in the circumferential direction; and a hexagonal shaft coupling hole 28 which is provided so as to protrude outward from the partitioning wall 26 and into which the output shaft of the actuator 14 for automatic control is inserted. In addition, the molding draft angle of the fitting shaft part 25 is approximately 0°. Also, the reference sign 29 in FIG. 4A and FIG. 4B denotes a mold removal hole which is used during molding of the fitting claws 27.

The fitting shaft part 25 on the lever 7 side is rotatably fitted and supported on the bearing surface 22 of the bearing boss part 23, which is provided on the unit casing 2 side, with the bearing clearance set to 0.1 to 0.2 mm. Similarly, on the inner periphery of the fitting shaft part 25, the multiple fitting claws 27 provided on the lever 7 side are fitted and engaged in the fitting hole 24 provided on the unit casing 2 side to thereby rotatably fit and support the lever 7 on the fitting support part 13 provided on the side surface of the unit casing 2.

Due to the above-described configuration of the lever 7, when the lever 7 is applied to an air conditioner (air-conditioning device) designed for manual operation, the air conditioner can be configured by connecting a wire to the wire connection part 11 of the lever 7 such that the two air outlet mode dampers (foot damper and defroster/face damper) are opened or closed through the lever 7 by manual operation. On the other hand, when the lever 7 is applied to an air conditioner (air-conditioning device) designed for automatic control, the lever 7 can be used as it is, and the air conditioner can be configured by installing the actuator 14 on the side surface of the unit casing 2 through the three mounting bosses 15 with the output shaft of the actuator 14 inserted into the shaft coupling hole 28 of the lever 7, such that the two air outlet mode dampers can be opened and closed through the lever 7 by automatic control of the actuator 14.

According to this embodiment, the fitting hole 24 is provided in the fitting support part (support part) 13 on the unit casing 2 side and the multiple elastically deformable fitting claws 27 are provided in the fitting boss part (fitting part) 8 on the lever 7 side, and on the outer periphery of these fitting hole 24 and fitting claws 27, the bearing boss part 23 is provided on the unit casing 2 side and the fitting shaft part 25 is provided on the lever 7 side. In this way, fitting and engaging the fitting claws 27 and the fitting hole 24 allows the lever 7 to be engaged on the unit casing 2 in the axial direction without using a screw.

In addition, rotatably fitting the bearing boss part 23 and the fitting shaft part 25 with a bearing clearance between them on the outer periphery of where the fitting claws 27 and the fitting hole 24 are fitted and engaged allows the lever 7 to be rotatably fitted and supported on the unit casing 2. In this way, it is possible to rotatably fit and support the lever 7 on the unit casing 2 while preventing deformation and positional shift in the out-of-plane direction of the lever 7 supported by the elastically deformable fitting claws 27 with the fitting part between the bearing boss part 23 and the fitting shaft part 25 on the outer periphery thereof.

Thus, it is possible to reduce the assembly manhours of the lever 7 by omitting the screw, as well as to increase the accuracy of the stop positions of the air outlet mode dampers and improve the air conditioning performance by eliminating the positional shift of the lever 7.

In addition, the fitting claws 27 are provided at regular intervals at three or more positions in the circumferential direction. In this way, fitting and engaging the elastically deformable fitting claws 27, which are provided at regular intervals at three or more positions in the circumferential direction, into the fitting hole 24 allows the lever 7 to be stably and reliably engaged on the unit casing 2 in the axial direction. In addition, fitting the bearing boss part 23 and the fitting shaft part 25 on the outer periphery of the fitting claws 27 and the fitting hole 24 can reliably prevent the positional shift of the lever 7 due to deformation of the fitting claws 27.

Thus, it is possible to reduce the assembly manhours of the lever 7 by omitting the screw, and at the same time to prevent deformation and positional shift in the out-of-plane direction of the lever 7 due to deformation of the fitting claws 27.

Moreover, the bearing clearance between the bearing boss part 23 and the fitting shaft part 25 is set to 0.1 to 0.2 mm, and their molding draft angle is approximately 0°. In this way, the amount of the positional shift of the lever 7 can be limited at the most to the bearing clearance defined between the bearing boss part 23 and the fitting shaft part 25, namely, to about 0.1 to 0.2 mm.

Thus, it is possible to increase the accuracy of the stop positions of the multiple air outlet mode dampers and improve the air conditioning performance.

In addition, in this embodiment, the relation of the axial length L of the fitting part between the bearing boss part 23 and the fitting shaft part 25, which are fitted together, to the diameter D of the bearing boss part 23 and the fitting shaft part 25 is set to L≥0.5D. In this way, a sufficient axial length L of the fitting part between the bearing boss part 23 and the fitting shaft part 25 can be secured, and the wobbling of the lever 7 in the radial direction can be almost eliminated.

Thus, it is possible to limit the positional shift of the lever 7 and further increase the accuracy of the stop positions of the air outlet mode dampers.

In addition, the shaft coupling hole 28, into which the output shaft of the actuator 14 for automatic control is inserted, is provided at the center of the fitting boss part (fitting part) 8 on the lever 7 side. In this way, engaging the lever 7 by means of the fitting claws 27 and the fitting hole 24 and omitting the screw allows the provision of the shaft coupling hole 28 for inserting the output shaft of the actuator 14 for automatic control at the center position of the fitting boss part 8 of the lever 7.

Thus, when the air conditioner is designed for automatic control, the actuator 14 can be installed with its output shaft directly inserted into the shaft coupling hole 28, so that the installation space of the actuator 14 can be secured and the installation can be facilitated.

Moreover, in this embodiment, installing the actuator 14 for automatic control with its output shaft coupled with the shaft coupling hole 28 of the lever 7 can configure the automatically-controlled air conditioner, while connecting a wire to the wire connection part 11 of the lever 7 can configure the manually-operated air conditioner. In this way, the lever 7 can be used commonly for the air conditioner designed for automatic control and the air conditioner designed for manual operation without the need for changing the lever 7. In addition, as the actuator 14 for automatic control can be installed with its output shaft directly coupled with the shaft coupling hole 28 of the lever 7, the installation space of the actuator 14 can be secured.

Thus, it is possible to achieve a cost reduction by reducing the variety of the parts, as well as to secure the installation space of the functional parts and increase the flexibility in the layout of these parts when the air conditioner is designed for automatic control.

(Second Embodiment)

Figure 5A:
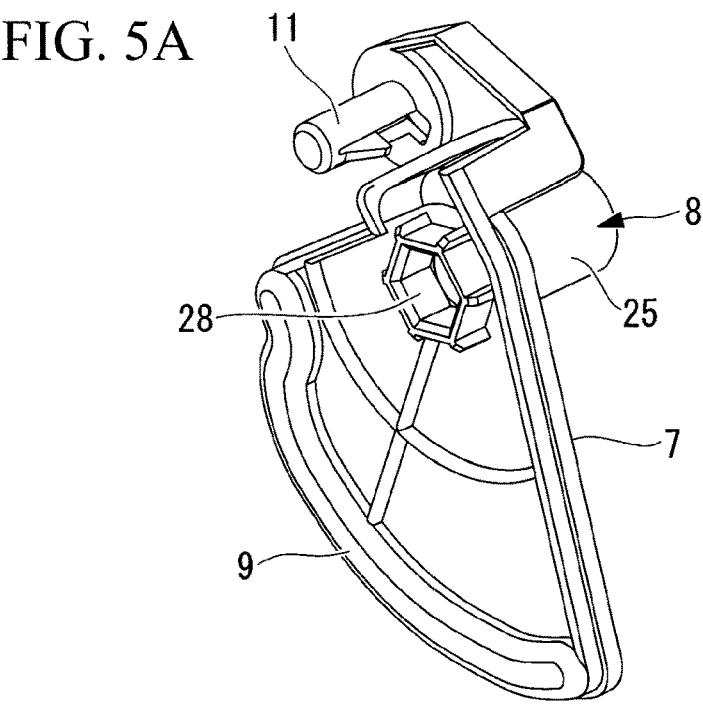
FIG. 5A is a perspective view from the left side of a lever according to a second embodiment of the present invention.
Figure 5B:
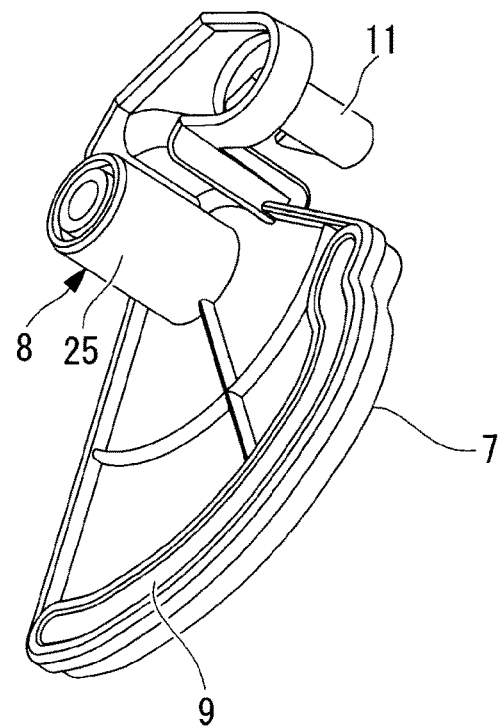
FIG. 5B is a perspective view from the right side of the lever according to the second embodiment of the present invention.
Figure 6:
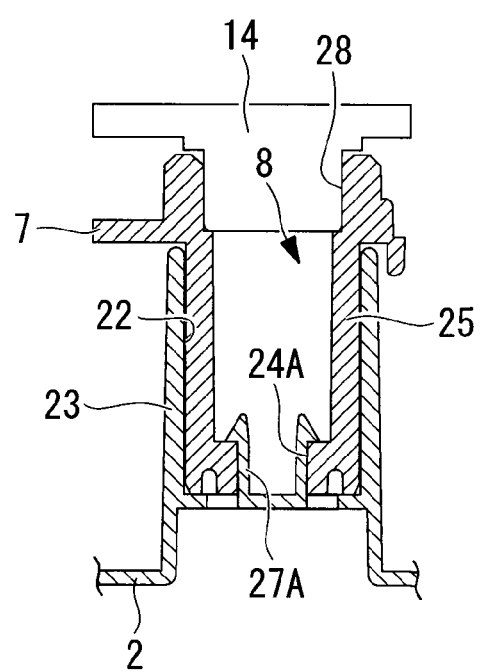
FIG. 6 is a cross-sectional view of a fitting support part for fitting and supporting the lever shown in FIG. 5 on the unit casing.

Next, a second embodiment of the present invention will be described using FIG. 5A, FIG. 5B, and FIG. 6.

This embodiment differs from the above-described first embodiment in that a fitting claw 27A and a fitting hole 24A are provided on the opposite side of the unit casing 2 and the lever 7. Description of other configurations, which are the same as those of the first embodiment, will be omitted.

In this embodiment, the fitting claw 27A is integrally molded on the unit casing 2 side, while the bearing boss part 23, in which the inner peripheral surface serves as the bearing surface 22, is integrally molded on the outer periphery of the fitting claw 27A. The fitting hole 24A, in which the fitting claw 27A on the unit casing 2 side is fitted and engaged, is integrally molded on the lever 7 side, and the fitting shaft part 25, with which the bearing boss part 23 on the unit casing 2 side is rotatably fitted, is integrally molded on the outer periphery of the fitting hole 24A, and the shaft coupling hole 28, into which the output shaft of the actuator 14 is inserted, is provided on the side opposite to the fitting shaft part 25.

In this way, working effects similar to those of the first embodiment can be obtained also by the configuration in which the fitting claw 27A is provided on the unit casing 2 side and the fitting hole 24A is provided on the lever 7 side as opposed to the first embodiment. However, providing the fitting claw 27A on the unit casing 2 side and providing the fitting hole 24A on the lever 7 side as in this embodiment can simplify the configuration and make the diameter of the fitting support part of the lever 7 smaller compared with the first embodiment.

In addition, the present invention is not limited to the invention according to the above-described embodiments, but modifications can be made appropriately without departing from the scope of the present invention. For example, in the above mentioned embodiments, while the example where the present invention is applied to the lever 7 for turning air outlet mode dampers has been described, the present invention may be applied as well to levers for driving other dampers.

REFERENCE SIGNS LIST

1 HVAC unit
2 Unit casing
7 Lever
8 Fitting boss part (fitting part)
11 Wire connection part
13 Fitting support part (support part)
14 Actuator
16 Damper rotational axis
17 Damper rotational axis
23 Bearing boss part
24 Fitting hole
24A Fitting hole
25 Fitting shaft part
27 Fitting claw
27A Fitting claw
28 Shaft coupling hole
D Bearing surface diameter
L Axial length

The invention claimed is:

1. A vehicle air-conditioning device, in which a lever for turning a damper is rotatably fitted and supported on a unit casing and in which the lever can be rotated either by manual operation or by automatic control, wherein
one of a support part on the unit casing side and a fitting part on the lever side is integrally molded with an elastically deformable fitting claw, while the other of the support part and the fitting part is provided with a fitting hole, into which the fitting claw is fitted and engaged, and a bearing boss part and a fitting shaft part, which are rotatably fitted together with a bearing clearance between them, are provided on the outer periphery of the fitting claw and the fitting hole, and wherein
a fitting portion between the bearing boss part and the fitting shaft part is located on a surface orthogonal to a rotational shaft of the lever and passing through a part where the fitting claw and the fitting hole are fitted and engaged, and
the bearing clearance between the bearing boss part and the fitting shaft part is set to 0.1 to 0.2 mm, and their molding draft angle is approximately 0°.

2. The vehicle air-conditioning device according to claim 1, wherein the fitting claw is provided at regular intervals at three or more positions in the circumferential direction.

3. The vehicle air-conditioning device according to claim 1, wherein the relation of the axial length L of the fitting part between the bearing boss part and the fitting shaft part to the diameter D of the bearing boss part and the fitting shaft part is L≥0.5D.

4. The vehicle air-conditioning device according to claim 1, wherein a shaft coupling hole, into which an output shaft of an actuator for automatic control is inserted, is provided at the center position of the fitting part on the lever side.

5. The vehicle air-conditioning device according to claim 4, wherein the vehicle air-conditioning device is configured such that installing the actuator for automatic control with its output shaft coupled with the shaft coupling hole of the lever can configure an automatically-controlled air conditioner, while connecting a wire at a predetermined position of the lever can configure a manually-operated air conditioner.

* * * * *